March 31, 1970   W. R. PETERSON   3,503,352
AUTOMATIC POSITIONERS FOR ELECTRICALLY DRIVEN FAMILY
SEWING MACHINES
Filed July 1, 1968   4 Sheets-Sheet 1

INVENTOR.
Wesley R. Peterson
BY
Marshall J. Breen
ATTORNEY

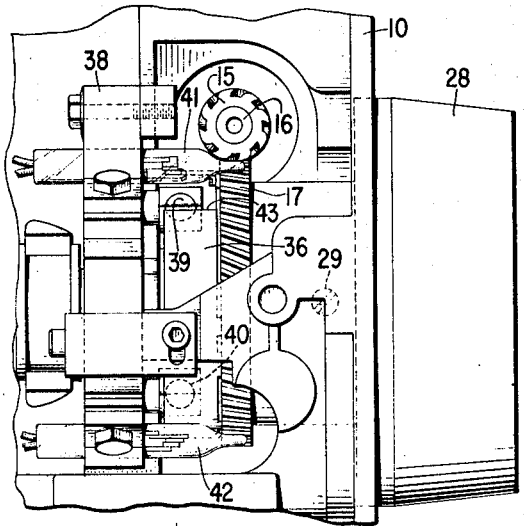
Fig. 3
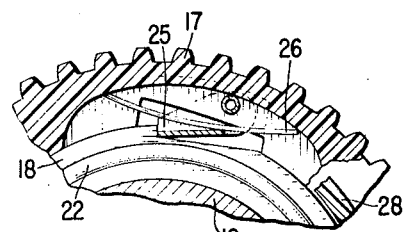
Fig. 4
Fig. 7
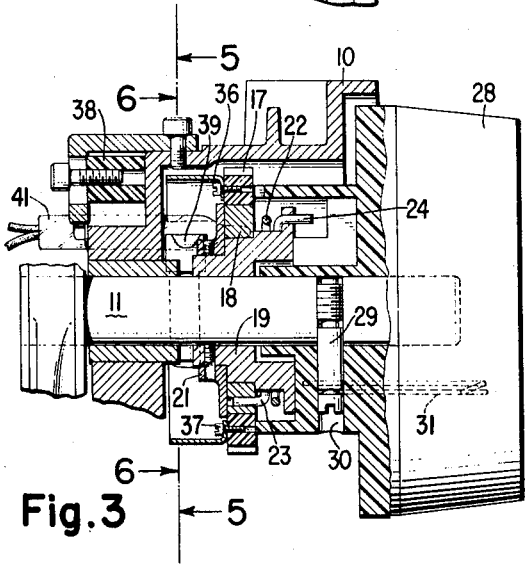
Fig. 5
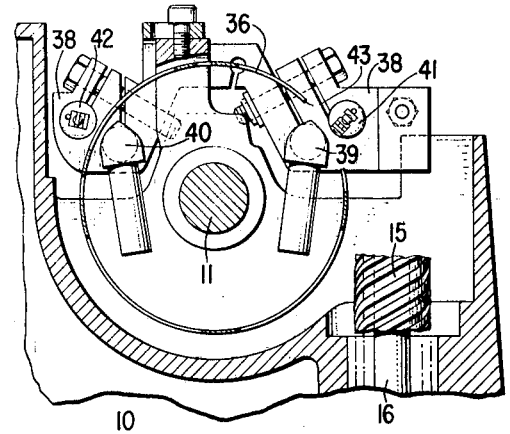
Fig. 6
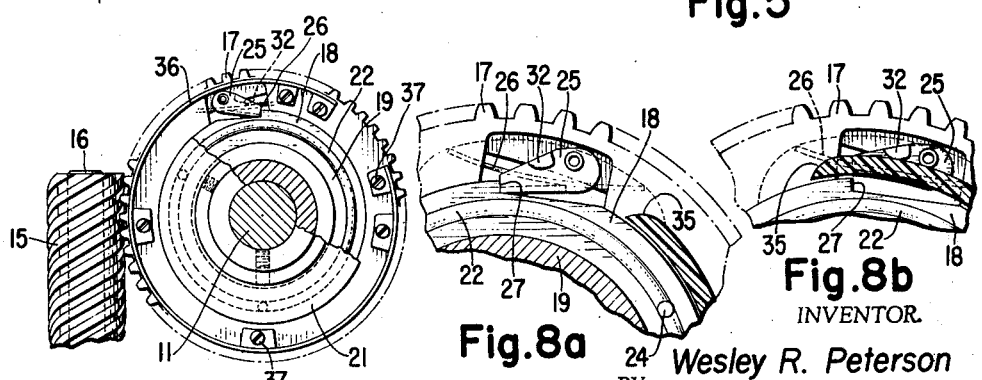
Fig. 8a
Fig. 8b
INVENTOR.
Wesley R. Peterson

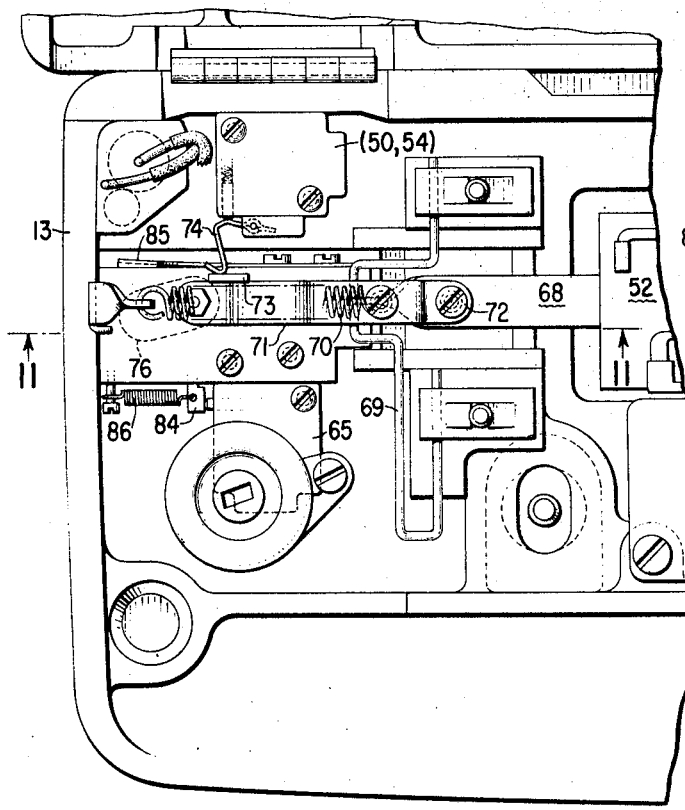

United States Patent Office 3,503,352
Patented Mar. 31, 1970

3,503,352
AUTOMATIC POSITIONERS FOR ELECTRICALLY DRIVEN FAMILY SEWING MACHINES
Wesley R. Peterson, Bound Brook, N.J., assignor to The Singer Company, a corporation of New Jersey
Filed July 1, 1968, Ser. No. 741,458
Int. Cl. D05b 69/00; F16d 11/06; H02k 23/08
U.S. Cl. 112—219          5 Claims

ABSTRACT OF THE DISCLOSURE

A sewing machine driven by an electric motor has a foot-controller-actuated variable resistance arranged in a first circuit for variably gating a solid state controlled rectifier (SCR) to provide normal running speed range control. A second circuit provides a fixed resistance low-speed high-torque SCR drive for the motor. The motor is drivingly coupled to the arm shaft of the sewing machine through a one-way pawl clutch and a handwheel is fixed to the arm shaft through a spring-biased lost-motion connection. The input end of the clutch positionally controls the actuation of a selected one of two switches corresponding respectively to a different predetermined stop position of the arm shaft. These switches operate to disable the second circuit in response to the attainment of a selected one of said positions as sensed from the input end of the clutch. Means operative responsively to complete relaxation of the foot controller disables the first circuit, enables the second circuit and selects one of said switches for positional control of said second circuit. Means operative responsively to slight actuation of the foot controller from its fully relaxed position to a second relaxed position selects the other one of said switches for positional control. After a motor-driven positional stop, the handwheel can be immediately used to manually turn the armshaft further in the driven direction without interference from the motor drive because of the one-way clutch feature. Initial reverse turning of the handwheel due to the lost-motion connection with respect to the armshaft, first operates a pawl lifter to disengage the clutch, freeing the motor drive and further reverse movement of the handwheel then rotates the armshaft for manual repositioning without interference from the positioning motor drive because of the disengaged clutch.

BACKGROUND OF THE INVENTION

While means are known in the prior art for automatically positioning family sewing machines, so far as I am aware, none have been commercially successful. One reason for this is that a stable, fixed, low-speed, high-torque motor drive was not heretofore used for the positioning drive, resulting either in overrunning the desired stop position or in stalling before such position was reached. Further, only one preselected stop position has been generally available for family machine positioners whereas two preselected positions are desirable. Perhaps the greatest disadvantage of prior art systems has been their inability to permit instant manual handwheel repositioning in both directions, if desired, following an automatic positional stop because of adverse interference with the positioning motor drive.

SUMMARY OF THE INVENTION

It is an object of this invention, therefore, to provide an automatic needle positioner for family sewing machines which overcomes the disadvantages of the prior art systems indicated above.

In attaining the objective of this invention, motor speed control circuits employing an SCR are used to obtain high torque at low speed. Normally, the foot controller, in a first circuit, applies variable gate voltage to the SCR for manual control of the running speed range. However, when the foot controller is fully released, the first circuit is disabled and a second circuit is established which applies a predetermined fixed gate voltage to the SCR for fixed low speed operation at high torque. The second circuit is completed through a selected one of two disabling switches which are actuated responsively to different motor driven positions of the armshaft. When the position corresponding to the selected switch is reached, the motor is disabled and the machine stops instantly in the desired position. There is no tendency to over-run because of the slow speed drive and no tendency to stall because of the high torque. The positioning switches, which disable the second circuit, are selected by the operator responsively to foot controller actuation. In the fully relaxed position of the foot controller one switch is automatically selected say, for controlling the needle-up position. By slight depression of the controller from the first relaxed position to a second relaxed position, the other switch for controlling the needle down position is automatically selected. The motor is drivingly coupled to the arm shaft through a one-way pawl clutch. A hand wheel is connected to the arm shaft through a spring-biased lost-motion link. Initial movement of the handwheel to take up the lost motion thus provided is utilized to first lift the pawl to disengage the clutch and free the motor drive connection, after which, further movement of the handwheel positions the arm shaft as desired and without adverse interference from the motor drive, which remains stationary. Turning the handwheel in the opposite direction also positions the arm shaft without interference with the motor drive because of the one-way clutch feature described above.

DESCRIPTION OF THE INVENTION

In the drawings, FIG. 1 shows an embodiment of this invention applied to an electrically-driven sewing machine controlled by a foot controller.

FIG. 3 is a longitudinal sectional view taken through the arm shaft of the sewing machine of FIG. 1 showing details of the clutch and positioning sensing means of this invention.

FIG. 4 is a top plan view of the structure shown in FIG. 3.

FIG. 5 is a vertical sectional view taken on line 5—5 of FIG. 3.

FIG. 6 is a vertical sectional view taken on line 6—6 of FIG. 3.

FIG. 7 is a detail of a portion of the clutch shown in FIG. 6.

FIGS. 8a and 8b are details showing the different operative positions of the parts of FIG. 7 for movement of the handwheel relative to the armshaft.

FIG. 10 is a plan view of a portion of a foot controller showing special switching mechanism utilized in this invention.

FIG. 11 is an elevational section taken on line 11—11 of FIG. 10.

FIGS. 12, 13 and 14 are detailed views showing the various operative positions of the parts for different positions of the controller actuator.

FIG. 15 is a detailed view showing the biasing arrangement for the camming structure of FIG. 12.

Figure 1:
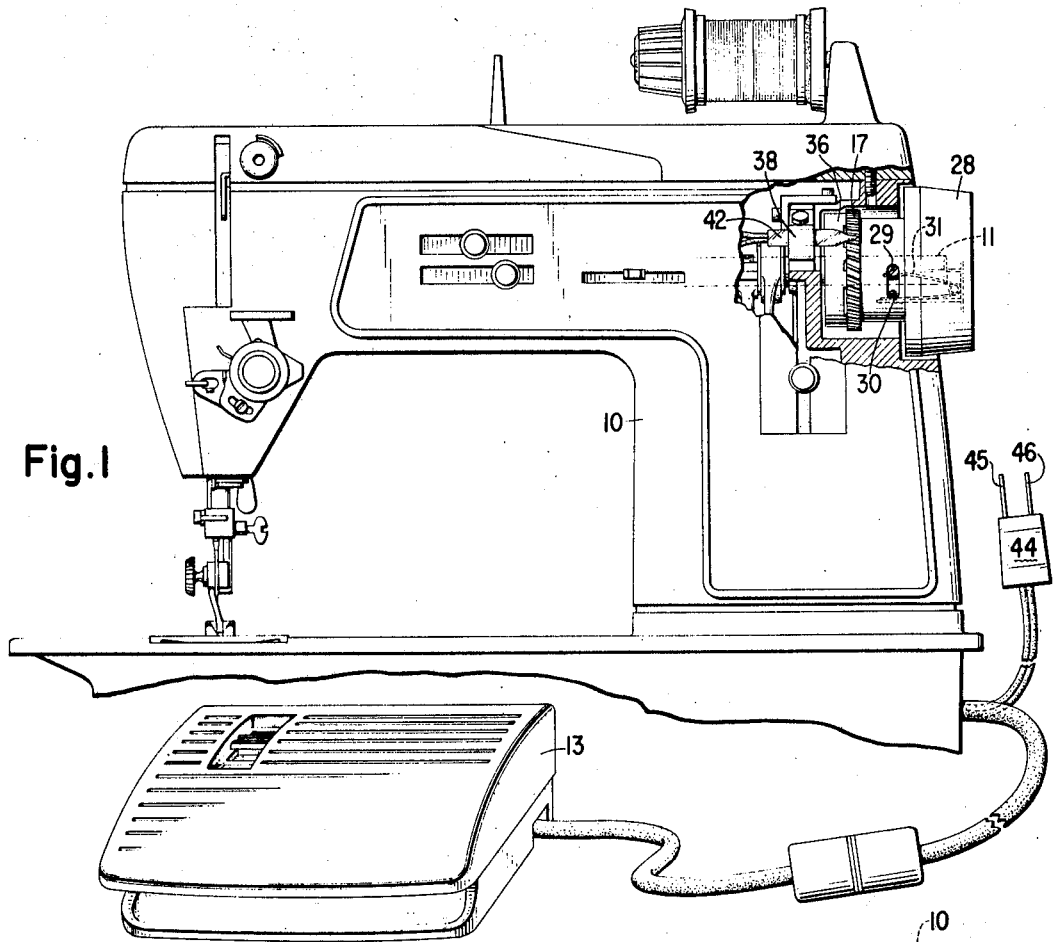
Figure 2:
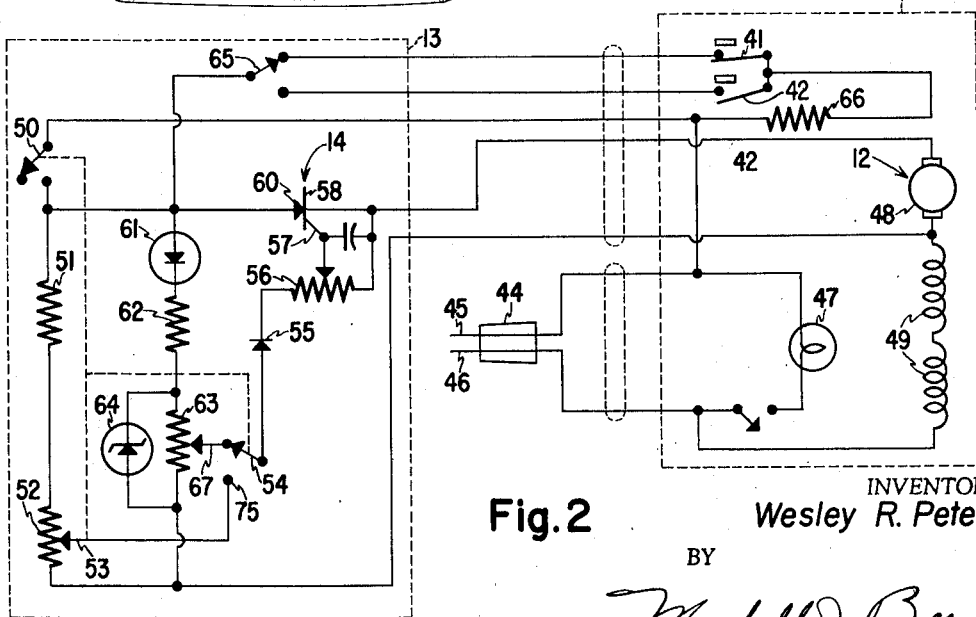
FIG. 2 is a schematic wiring diagram showing the circuit configuration employed in this invention.
Figure 9:
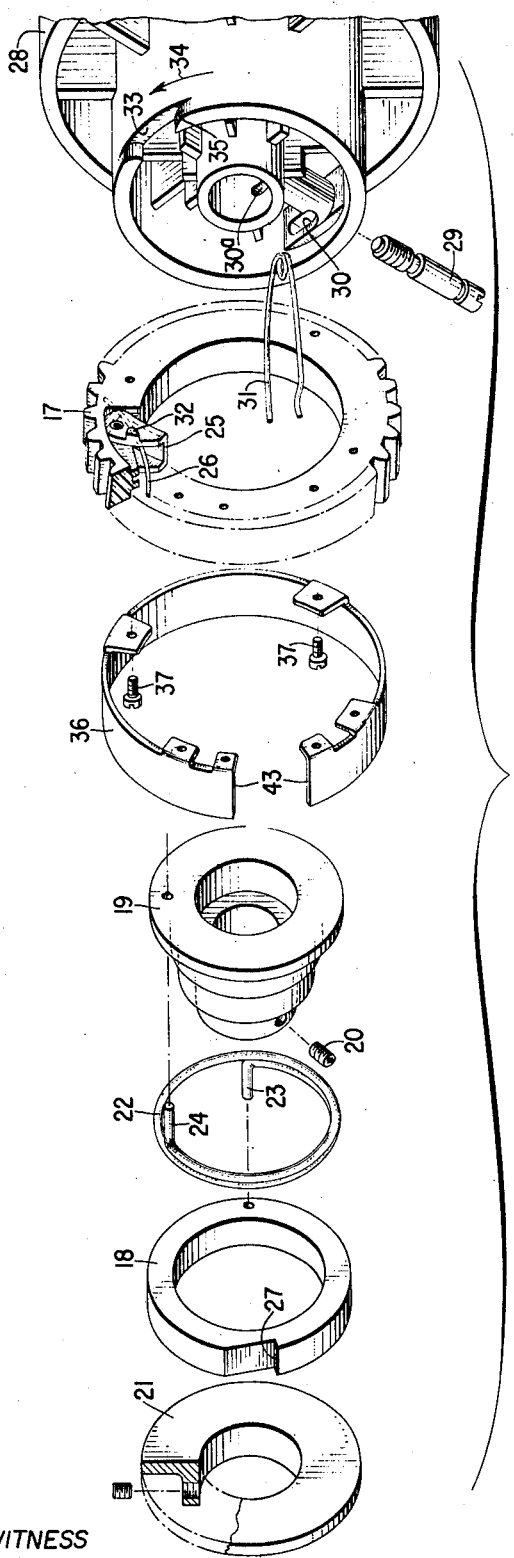
FIG. 9 is a disassembled perspective view of the clutch and positioning sensing means of FIG. 3.

Referring to FIGS. 1 and 2, a sewing machine 10 has an armshaft 11 driven by an electric motor 12 at various speeds selected by suitable depression of a foot controller 13 beyond an initial relaxed position. The foot controller 13 contains a silicon controlled rectifier 14 and an associated circuitry whereby, as will be described later, (a) the motor may be operated over a normal running speed range by actuation of the controller beyond a first initial movement, (b) full relaxation of the controller provides a fixed low-speed high-torque motor condition for positional drive to a first predetermined position of the armshaft, and (c) limited actuation of the controller from its first relaxed position to a second relaxed position provides a fixed low-speed high-torque motor condition for positional drive to a second predetermined position of the armshaft.

A special coupling between the motor and the armshaft is required as well as positional sensing means to determine when the desired armshaft position has been reached, and these will now be described with reference to FIGS. 3 through 9.

Referring specifically to FIG. 6 a spiral pinion gear 15 secured to the motor shaft 16 drives a ring gear 17 rotatably mounted on an inner annular member 18 which, in turn, is rotatably mounted on one of the stepped portions of a multi-stepped hub 19 (FIG. 9) secured to the armshaft 11 by means of a set screw 20. A collar 21 secured to the smallest step portion retains the members 17 and 18 on the step. A spiral spring 22 has one end 23 anchored in member 18 and is wrapped around a large stepped portion of the hub 19 with its opposite end 24 anchored in the hub 19 as shown best in FIG. 3.

The gear ring 17 carries inwardly of its periphery a pivoted pawl 25 normally biased by leaf spring 26 to engage a notched portion 27 of the member 18. From the above it will be seen that the gear 17 and the element 18 function respectively as the input and output elements of a one-way clutch for driving the armshaft 11 from the motor 12.

A handwheel 28 is coupled to the armshaft 11 through a lost-motion connection comprising a screw 29 tapped into the armshaft 11 and free to turn a limited amount in slotted portions 30 and 30a of the handwheel 28. A hairpin spring 31 provides resilient means for normally taking up the lost-motion in one direction.

The pawl 25 has a lip portion 32 which extends axially into a cut-away portion 33 of the handwheel 28 so that initial movement of the handwheel in the direction of the arrow 34 (FIG. 9) to take up the lost-motion will first move the cam portion 35 to raise the lip portion 32 and pivot the pawl 25 out of engagement with the notch 27. Further movement of the handwheel 28 will turn the armshaft 11 but without disturbing the position of the gear 17.

The structure described above affords means for manual repositioning of the armshaft 11 from the handwheel 28 in both directions after a motor-driven stop position is reached and without moving the gear 17, and its importance will become clear in what follows.

The gear 17, which is driven directly by the motor 12, carries a magnetic shield ring 36 secured thereto by screws 37. A bracket 38 secured to a stationary part of the sewing machine serves to support permanent magnets 39 and 40 and conventional magnetic reed switches 41 and 42 as seen best in FIG. 5. It will be seen that switch 41 is aligned radially with respect to magnet 39 and switch 42 is aligned radially with respect to magnet 40, and the shield ring 36 is interposed between the magnets and the switches. The switches 41 and 42 are of the normally-closed type and the shield ring 36 is formed with a small gap portion 43. The function of the rotating shield ring 36 is to normally divert the flux from the magnets 39 and 40 from influencing the actuation of switches 41 and 42 except when the gap portion 43 lies directly between a magnet and a switch in which condition the flux is free to actuate the respective switch to open position. Thus there are two predetermined positions of the ring gear 17 corresponding to motor-driven positions of the armshaft 11 in which a switch (41 or 42) will be opened.

There will be described with reference to FIG. 2 a circuit in which either switch 41 or 42 can be selected to stop the motor in a low-speed high-torque driving condition responsively to an open condition of the selected switch, i.e., responsively to either of two predetermined motor-driven positions of the ring gear 17.

The foot controller 13 provides selectively either a first circuit for controlling the motor 12 or a second circuit which provides a fixed low speed for motor drive positioning. Both circuits are basically the same as the circuit described in the U.S. Wigington Patent No. 3,302,088, the difference between them being substantially only in the manner in which the reference voltage is supplied.

A plug 44 having terminals 45 and 46 is adapted for connection to a conventional A.C. wall outlet and supplies the A.C. voltage for a lamp 47 and for the motor 12 having series-connected armature winding 48 and field winding 49.

A switch 50, when closed, connects a voltage divider comprising resistor 51 and potentiometer 52 in series with the field winding 49 across the A.C. supply. The potentiometer 52 has a slider 53 which is actuated by the foot controller 13 to supply a variable reference voltage by way of switch 54 and diode 55 to a three-terminal trim potentiometer 56 which divides down the reference voltage for application to the gate 57 and cathode 58 of the silicon controlled rectifier (SCR) 14. The function of the three-terminal trim potentiometer 56 is set forth in the U.S. Mais Patent No. 3,374,758 to which reference may be made for a detailed explanation. The power current to the motor is supplied through switch 50, the anode 60, the cathode 58, the series armature and field windings 48 and 49 to the other side of the A.C. voltage supply. As indicated by the dashed lines, the switch 50, switch 54 and slider 53 are interconnected mechanically, in a manner to be described, so that, in the relaxed position of the foot controller 13, the switches 50 and 54 are in the position shown and the circuit just described is normally disabled. However, initial limited actuation of the foot controller will close switches 50 and 54 to enable this circuit and further actuation will variably control the motor over a full range of running speeds.

There will now be described the fixed low-speed circuit used for positioning control of the motor 12. The voltage divider for the reference voltage for the fixed low-speed circuit comprises a diode 61, resistor 62 and a potentiometer 63 with a shunted voltage-regulating Zener diode 64. This divider is energized by a selector switch 65 which provides a circuit through a selected reed switch 41 or 42 and resistor 66 to one side of the A.C. voltage supply. The power current for motor 12 is also supplied to the anode 60 of SCR 14 through the switch 65 and selected reed switch 41 or 42. As described above, the switch 54 is in the position shown in FIG. 2 in the relaxed position of controller 13. Thus the position of slider 67 fixes a low reference voltage for application to the gate 57 and cathode 58 of SCR 14 and this establishes a fixed low speed for the motor 12. The circuit just described is enabled through closure of one of the reed switches 41 and 42 selected by switch 65 so that when the gear 17, driven by the motor 12, positions the shield ring 36 with the gap 43 aligned with the selected reed switch 41 or 42 this circuit is disabled and the motor stops almost instantly leaving the gear 17 and the armshaft 11 in this position.

There will now be described with reference to FIGS. 10 through 15 means for providing proper actuation of switches 50, 54 and selector switch 65 responsively to actuation of the foot controller 13.

Referring to FIG. 10, a foot controller 13 of the type described more fully in the U.S. Cook et al. Patent No.

3,364,452 is shown. For purposes of this disclosure it will suffice to note that potentiometer 52 has an actuator 68 which moves substantially linearly responsively to pedal actuation of the bell crank 69. The position shown in FIG. 10 is the fully relaxed position of the controller with the actuator 68 in its extreme left extended position urged by biasing spring 70.

A link 71 secured to the actuator 68 by screw 72 is formed with a cam plate 73 which cams a lever 74 to actuate the biased switch 50, 54. This switch, which is shown functionally as two switches 50 and 54 in FIG. 2, may be a single double-pole double-throw microswitch with one pole for each function. The position of the parts as shown in FIG. 10 corresponds to the position of the switches 50 and 54 in FIG. 2. It will be seen that initial pedal actuation of a limited amount will maintain the switch 50, 54 in the condition shown in FIG. 10, after which continued pedal actuation will move the cam plate 73 away from contact with the lever 74, permitting the biased switch to simultaneously close 50 and move 54 into contact with terminal 75 as seen in FIG. 2. This action enables the running speed control circuit and disables the low-speed positioning control circuit as described above.

Mechanism for actuation of the selector switch 65 will now be described. Referring to FIG. 11, a member 76 is formed at one end with a pin 77 for pivotal and resilient connection to the end of link 71. The other end of member 76 is formed with a pin 78 which is constrained to move in a slot 79 as seen best in FIGS. 12–14. The slot 79 is formed with a reverse bend 80 and with a re-entrant opening 81 normally closed by a pivoted gate 82 biased by spring 88 (FIG. 15). A guide spring 85 guides the member 76 laterally as shown in FIG. 12, and urges the pin 78 to move into the reverse bend 80 when the foot controller is relaxed, and gate 82 prevents pin 87 from entering the opening 81 during this movement.

A second spring-biased gate 83 permits pin 78 to pass and to establish a second relaxed position of the foot controller as will be explained. In this second relaxed position, gate 83 moves a spring-biased cam 84 to actuate the selector switch 65 to select the other one of the reed switches 41, 42 thus selecting a second predetermined stop position for the armshaft 11 as explained above.

FIG. 12 illustrates the arrangement of the parts in the fully relaxed condition of the foot controller. Switch 65 is in the position shown in FIG. 2 with the actuator cam 84 fully retracted by the bias spring 86. Gate 83 is closed by action of spring 87 as seen in FIG. 15. If now it is desired to effect a stop in a second and different position of the armshaft 11, the controller 13 is actuated just enough to permit pin 78 to push open gate 83 which closes behind it due to spring 87. If now the controller is relaxed, the spring 70 overcomes the bias of spring 86 and the actuator cam 84 moves to the right as seen in FIG. 14 to actuate selector switch 65 to the other closed position from that shown in FIG. 2 thus selecting reed switch 42 for controlling the second stop position.

Further actuation of the controller from the relaxed position shown in FIG. 14 moves the pin 78 away from the gate 83 and permits spring 86 to rertact the cam 84 and restore selector switch 65 to its original condition shown in FIG. 2. Continued actuation of the controller permits the pin 78 to push open the gate 82 and enter the slot 79 as seen in FIG. 13. By this time switch 50, 54 has been actuated and normal running speed is established.

From the above, it will be evident that if the second stop position is not desired, it may be omitted at will by merely actuating the controller from a fully relaxed position to the running position without establishing the second relaxed position.

In accordance with the attributes of this invention, there is provided mechanical and circuit structure whereby electrically driven family type sewing machines may be commanded, solely in response to the actuation of a single foot controller to operate normally over a running speed range or to stop automatically and accurately in either one of two motor-driven selected positions of the armshaft, with the additional capability of permitting immediate manual repositioning in either direction by the handwheel after each automatic stop and without interference with the motor drive.

It is important in those applicaions where automatic thread cutting is performed with the needle in the up position that the take-up also be in the up position at the end of the positioning cycle so that the needle will not become unthreaded when the machine is next commanded to run. This requires very accurate positioning to make the two events coincide at the end of the positioning cycle and it is one of the special attributes of this invention to make this performance possible.

It will be noted that the two-way clutch described above for release of the motor driving connection responsively to manual handwheel rotation in both directions would have desirable use quite apart from the needle positioning drive in which it is used here. If used in a normal non-positioning drive, this clutch drive would free the operator from the burden of supplying the torque necessary to rotate the motor which may be considerable due to the adverse torque ratio.

Having thus set forth the nature of this invention, what I claim herein is:

1. An electric drive and positioning system for a sewing machine having an armshaft and an electric motor drivingly coupled to the armshaft comprising: a controlled rectifier, said electric motor being controlled over a speed range by said rectifier, a first circuit including operator-influenced means for variably controlling the rectifier over said speed range, a second circuit including said rectifier and providing a fixed low-speed high-torque drive for the motor, means operative responsively to a relaxed position of said operator-influenced means for disabling said first circuit and enabling said second circuit, and switch means included in said second circuit and operative responsively to a predetermined rotative position of the armshaft for disabling said second circuit to stop said motor in said predetermined position of the armshaft.

2. An electric drive and positioning system according to claim 1 wherein a second switch means operative responsively to a second predetermined motor-driven position of the armshaft is selectively substituted for the first switch means in response to slight movement of the operator-influenced means from its fully relaxed position to a second relaxed position.

3. An electric drive and positioning system for a sewing machine having an armshaft and a handwheel coupled to said armshaft, comprising: a controlled rectifier, an electric driving motor controlled over a speed range by said rectifier, a first circuit including operator-influenced means for variably controlling the rectifier over said speed range, a second circuit including said rectifier and providing a fixed low-speed high-torque drive for the motor, means operative responsively to a relaxed position of said operator-influenced means for disabling said first circuit and enabling said second circuit, switch means included in said second circuit and operative responsively to a predetermined motor-driven rotated position of the armshaft for disabling said second circuit to stop said motor in said predetermined position and a one-way clutch having a driving element connected to the motor and a driven element connected to the armshaft, said switch means including actuating means responsive to a predetermined position of the driving element of the clutch to enable handwheel movement of the armshaft in one direction without influencing said switch actuating means.

4. An electric drive and positioning system for a sewing machine having an armshaft and a handwheel coupled to said armshaft through a rotative lost-motion connection, comprising: a controlled rectifier, an electric driving motor controlled over a speed range by said rectifier, a first circuit including operator-influenced means for variably controlling the rectifier over said speed range, a second circuit including said rectifier and providing a fixed low-speed high-torque drive for the motor, means operative responsively to a relaxed position of said operator-influenced means for disabling said first circuit and enabling said second circuit, switch means included in said second circuit and operative to disable said second circuit to stop said motor, a clutch having a driving element connected to the motor and a driven element connected to the armshaft, means normally drivingly engaging said clutch elements, means operative responsively to rotation of said handwheel to take up the lost-motion to disengage said clutch elements, and means for operating said switch means responsively to a predetermined rotative position of the driving element of the clutch whereby manual rotation of the handwheel in either direction does not influence the operation of said switch means.

5. An electric drive and positioning system in accordance with claim 4 wherein the means for operating said switch means is a magnetic shield ring secured to the driving element of the clutch.

References Cited

UNITED STATES PATENTS

| 3,319,591 | 5/1967 | Hamlett | 112—220 |
| 3,374,758 | 3/1968 | Mais | 112—220 |
| 3,407,910 | 10/1968 | Heidt | 112—219 |

H. HAMPTON HUNTER, Primary Examiner

U.S. Cl. X.R.

192—26, 142; 318—246